United States Patent [19]
Rathbone

[11] Patent Number: 5,295,351
[45] Date of Patent: Mar. 22, 1994

[54] AIR SEPARATION

[75] Inventor: Thomas Rathbone, Farnham, England

[73] Assignee: The BOC Group, plc, England

[21] Appl. No.: 43,430

[22] Filed: Apr. 6, 1993

[30] Foreign Application Priority Data

Apr. 22, 1992 [GB] United Kingdom ............... 9208646

[51] Int. Cl.$^5$ .................................................. F02G 3/00
[52] U.S. Cl. ............................... 60/39.05; 60/39.53; 60/39.54; 60/39.59; 75/466; 75/958; 266/155
[58] Field of Search ............ 60/39.05, 39.53, 39.54, 60/39.59; 62/30, 39; 75/466, 958; 266/155, 160

[56] References Cited

U.S. PATENT DOCUMENTS

| | | | |
|---|---|---|---|
| 4,019,314 | 4/1977 | Springmann | 60/39.12 |
| 4,075,831 | 2/1978 | McGann | 60/39.59 |
| 4,224,045 | 9/1980 | Olszewski et al. | 62/30 |
| 4,382,366 | 5/1983 | Gaumer | 62/39 |
| 4,557,735 | 12/1985 | Pike | 62/18 |
| 4,631,915 | 12/1986 | Frewer et al. | 60/39.12 |
| 4,667,467 | 5/1987 | Archer et al. | 60/39.12 |
| 4,729,217 | 3/1988 | Kehlhofer | 60/39.12 |
| 4,806,136 | 2/1989 | Kiersz et al. | 62/18 |
| 5,080,703 | 1/1992 | Rathbone | 60/39.12 |
| 5,081,845 | 1/1992 | Allam et al. | 60/39.12 |

FOREIGN PATENT DOCUMENTS

| | | |
|---|---|---|
| 0384688 | 8/1990 | European Pat. Off. |
| 0503900 | 9/1992 | European Pat. Off. |
| 2261225 | 5/1993 | United Kingdom |

*Primary Examiner*—Richard A. Bertsch
*Assistant Examiner*—Howard R. Richman
*Attorney, Agent, or Firm*—David M. Rosenblum; Larry R. Cassett

[57] ABSTRACT

In a process integration, particularly with a blast furnace, low grade fuel gas produced by the furnace is compressed and moisturized. The moisturized fuel is burnt using a major part of a compressed air stream to support its combustion. The resulting combustion gases are then expanded with the generation of power. The minor part of the air is separated into oxygen and nitrogen. Oxygen is used in the blast furnace.

15 Claims, 1 Drawing Sheet

AIR SEPARATION

BACKGROUND OF THE INVENTION

This invention relates to air separation and in particular to an integrated method of separating air and generating power, and integrated plant for performing such a method.

A gas turbine comprises an air compressor, a combustion chamber and an expander. In operation, air is compressed in the compressor and is used to support combustion of a fuel gas in the combustion chamber. The resulting gaseous combustion products are then expanded in the expander or turbine with the performance of external work. This work may be the generation of electricity. Thus, the gas turbine may form part of a power station with the rotors of the compressor and expander and an alternator all mounted on the same shaft.

Commercial processes for the separation of air first require its compression. It is known to bleed compressed air from the air compressor of a gas turbine to feed an air separation plant. In a conventional air separation process, air is compressed, is purified by the removal of components such as water vapor and carbon dioxide that are less volatile than its main components, cooled to a temperature suitable for its separation by rectification, and then rectified in a so-called double rectification column having a higher pressure and a lower pressure stage. The oxygen product is typically withdrawn from the lower pressure stage as a vapor and warmed to ambient temperature by heat exchange with the incoming air. The lower pressure stage is conventionally operated at a pressure a little above atmospheric pressure so that the oxygen product is obtained at about atmospheric pressure. In some schemes, oxygen product from the air separation plant is used in the generation of the fuel gas that is burned in the combustion chamber of the gas turbine. Such processes typically require the oxygen to be produced at elevated pressure. Although the necessary pressure can be created by compressing the oxygen, U.S. Pat. No. 4,224,045 discloses that there are advantages in terms of the operating efficiency of the air separation process to operate the lower stage of the double rectification column at pressures well above atmospheric pressure. Further, the compressor of a gas turbine typically has an outlet pressure in the order of 10 to 20 atmospheres which is in excess of that required by the air separation process when the oxygen is taken from the lower pressure stage of the double rectification column at a pressure a little above atmospheric. Accordingly, it is typically desirable to operate the higher pressure stage of the double rectification column at substantially the same pressure as the outlet pressure of the compressor of the gas turbine.

Not only is oxygen then produced at a pressure well above atmospheric pressure, so is a nitrogen product. There are a number of proposals in the art including U.S. Pat. No. 4,224,045 for taking a stream of this relatively high pressure nitrogen product, warming it to about ambient temperature by heat exchange with the incoming air to about ambient pressure, further compressing the stream, further raising the temperature of the stream in a second stage of heat exchange with the incoming air so as to remove heat of compression from such air and then introducing the nitrogen into the combustion chamber or expander of the gas turbine. Accordingly, the nitrogen helps to power the gas turbine and therefore compensates for the loss of the air taken for separation from the air compressor of the gas turbine. Other examples of such processes are given in U.S. Pat. No. 4,557,735 and U.S. Pat. No. 4,806,136. One practical example of the above-described method is in the gasification of coal and is discussed in a paper entitled "Air Separation Integration for GCC Plants", by Olson, Jr, Anand and Jahnke, Tenth EPRI Conference on Coal Gasification Power Plants, 16 to 18 October 1991, San Francisco. In the integrated process described in this paper, nitrogen from the air separation plant is saturated with water vapor before being introduced into the turbine. We believe one purpose of this moisturizing is to provide additional returning mass to the turbine so as better to compensate for the air from the compressor of the turbine that by-passes the combustion chamber and flows into the air separation plant.

There is increasing interest in using pure oxygen or oxygen-enriched air together with coal in processes which form iron by the reduction of iron ore. It has for example been proposed to inject coal together with oxygen or oxygen-enriched air into the tuyeres of a conventional blast furnace thereby reducing the demand of these processes for coke and hence reducing the need for the operation of coke ovens which are viewed as providing environmentally harmful waste products. See for example a paper entitled "Oxy-coke Injection at Cleveland Ironworks". D A Campell et al, 2nd European Ironmaking Congress, Glasgow, September 1991, pp 233-246. Alternative processes using both oxygen and coal, such as the COREX process, eliminate the need for coke altogether. Such processes produce a fuel gas as a by-product, although the fuel gas does not have the high calorific value of one produced by the direct gasification of coal. Indeed, current proposals for enhancing the operation of a blast furnace by use of oxygen and coal typically produce a fuel gas by-product having a calorific value of less than 5 MJ/m$^3$. Nonetheless, sufficient fuel gas is generated to make worthwhile its combustion for the generation of power. Thus, the fuel gas can be burned in a combustion chamber of a gas turbine and air taken from the compressor of the gas turbine for separation to form an elevated pressure oxygen product that is introduced into the blast furnace.

There is however a problem in introducing nitrogen into a gas turbine that employs a low calorific value fuel gas in its combustion chamber. The turbine has only a limited capacity for the return of pre-heated nitrogen and so only a part of the heat in the bleed air stream can be used for heating nitrogen. In addition, current gas turbine generally have fuel gas handling systems not able to handle gas at a temperature above 300° C. Accordingly, it is desirable to keep the temperature of any nitrogen stream introduced into the combustion chamber of the gas turbine at or below 300° C., and therefore a further limit is placed on the transfer of heat to such a nitrogen stream.

There is therefore a need for a method and apparatus which enables integrated air separation-gas turbine technology to be used when the fuel gas supplied to the gas turbine is of low calorific value, its source being for example a blast furnace. The invention aims at providing a method and plant that meet this need.

SUMMARY OF THE INVENTION

According to the present invention there is provided an integrated method of separating air and generating power, comprising:
a) compressing air without removing at least part of the heat of compression thereby generated;
b) dividing the compressed air flow into a major stream and a minor stream;
c) cooling the compresse minor air stream by heat exchange with a pressurized stream of water;
d) separating the minor air stream into oxygen and nitrogen;
e) moisturization a stream of compressed low grade fuel gas by introducing into it said pressurized stream of water downstream of the heat exchange between the stream of water and the minor air stream;
f) burning said moisturized fuel stream utilizing said major air stream to support its combustion; and
g) expanding with the performance of external work the combustion gases from the burning of the gaseous fuel stream; the work performed comprising the generation of said power.

The invention also provides integrated plant for separating air and generating power, comprising a gas turbine comprising an air compressor, combustion chamber and an expander; a heat exchanger having a first inlet communicating with an outlet from the air compressor and a second inlet communicating with a source of pressurized water, whereby in operation an air stream withdrawn from the compressor is able to be heat exchanged with a pressurized stream of water; means for separating the heat exchanged air into oxygen and nitrogen; means for moisturizing a compressed low grade fuel gas with said heat exchanged pressurized stream of water; and power generation means adapted to be driven by the gas turbine, wherein the combustion chamber communicates with an outlet from the air compressor and with said means for moisturizing the low grade compressed fuel stream and is able in operation to employ air from the compressor to support combustion of the fuel gas to provide hot gaseous combustion products for expansion in the expander.

By the term "low grade fuel gas" as used herein is meant a fuel gas having a calorific value of less than 12 $MJ/m^3$.

The method and plant according to the invention find particular use when the source of the low grade gaseous fuel stream is a blast furnace. There is an increasing trend in the iron and steel industry to operate blast furnaces with coal (in addition to coke) and with an air blast enriched in oxygen. The resulting gas mixture comprises nitrogen, carbon monoxide, carbon dioxide and hydrogen. The precise composition of this gas depends on a number of factors including the degree of oxygen enrichment. Typically, however, it has a calorific value in the range of 3 to 5 $MJ/m^3$. It is possible to operate the combined power recovery and air separation method according to the invention in conjunction with alternative processes for reducing iron ore to iron that produce a low grade fuel gas as a by-product.

The low grade fuel gas stream is typically produced at an elevated temperature, laden with particulate contaminants and includes undesirable gaseous constituents such as hydrogen cyanide, carbon oxysulphide and hydrogen sulphide. Processes and apparatuses for removing such contaminants are well known and produce a clean fuel gas at a temperature at or near to ambient. Such a process or processes may if desired be used to treat low grade fuel gas upstream of its introduction into the combustion chamber in accordance with the invention.

The stream of low grade fuel gas is preferably compressed to a pressure in the range of 10 to 25 atmospheres absolute upstream of its introduction into the combustion chamber. The precise pressure selected depends on the operating pressure of the combustion chamber. A compressor or compressors used for this purpose preferably have means associated therewith for removing the heat of compression at intermediate stages. A greater efficiency of compression is able to be achieved when the fuel gas compressor or compressors are operated with partial removal of the heat of compression than when they are not.

The compressed low grade fuel gas stream is preferably moisturized with the stream of pressurized water by countercurrent contact of the two streams with one another in a liquid-gas contact column. The column typically includes a packing in order to effect the contact between the liquid and the gas. Operation of such means enables the fuel gas to be saturated with water vapor at the operating pressure of the combustion chamber.

If desired, the moisturized stream of low grade fuel gas may be further heated intermediate the gas-liquid contact column and the combustion chamber so as to evaporate any droplets of liquid water carried out of the column in entrainment in the fuel gas and to increase overall efficiency.

Oxygen generated by the separation of the air is preferably used in the process which generates the low grade fuel gas. For example, it can be used to enrich the air supply to a blast furnace in oxygen.

The air is preferably separated by being rectified. The rectification of the air is preferably performed in a double column comprising a higher pressure stage and a lower pressure stage. There is preferably a condenser-reboiler associated with the two said stages of the double column so as to provide reboil for the lower pressure stage and reflux for both stages. The lower pressure stage preferably has an operating pressure (at its top) in the range of 3 to 6 atmospheres absolute depending on the desired supply pressure for the oxygen. Operation of the lower pressure stage in this range makes possible more efficient separation of the air than that possible at the more conventional operating pressures in the range of 1 to 2 atmospheres absolute. Typically, the pressure at which the higher pressure stage of the rectification column operates is a little below the outlet pressure of the air compressor of the gas turbine. If there is a condenser-reboiler linking the two stages of the rectification column, the operating pressure of the lower pressure stage depends on that of the higher pressure stage and thus places a limitation on the pressure at which the lower pressure stage can be operated.

The nitrogen product may be liquefied if there is not a use for it on the site of the gas turbine. Liquid nitrogen finds use in a wide range of chemical, metallurgical and industrial processes. Alternatively, if the nitrogen is produced at pressure, it may be preheated to a temperature typically in the range of 200° to 600° C. and then expanded with the performance of external work in an expander other than that of the gas turbine.

A hot gaseous stream of combustion products is typically exhausted from the expander of the gas turbine at a temperature in the range of 450° to 600° C. and a pressure in the order of 1 atmosphere absolute. It is desirable to recover the heat available in this stream. Accordingly, it may be used to raise steam. If desired, the steam may be expanded in a further turbine with the performance of external work, for example the generation of electrical power.

Alternatively or in addition, an exhaust stream from the expander of the gas turbine may be used to preheat air supplied to a blast furnace. Such air is conventionally heated to a temperature of over 1000° C. by passage through stoves which are heated by the combustion of fluid fuel. A part of the fluid fuel may be low grade fuel gas from the blast furnace. By preheating the air, it is possible to make a saving in the fuel that is used to heat the stoves. Either the rate of consumption of high grade fuel can be reduced, thereby offering a direct cost saving, or a reduction may be made in the rate at which low grade fuel gas from the blast furnace is supplied for the purposes of heating the blast air, thereby making possible an increase in the rate at which the low grade fuel gas is supplied to the gas turbine forming part of the plant according to the invention.

The method according to the present invention is particularly advantageous when operated in association with a blast furnace. It is preferred that at least 20% of the compressed air is taken for air separation. There is sufficient heat available in such a compressed air stream for the fuel gas produced by the blast furnace to be saturated in water vapor. At conventional gas turbine operating pressures, it is possible to enhance the rate of power generation while maintaining the fuel gas temperature at a level (i.e. below 300° C.) which is readily acceptable to the gas turbine. Moreover, at the operating pressure of the gas turbine the low grade fuel gas can accept water at a sufficient rate to enable a substantial degree of cooling to be provided for the minor stream of air. On the contrary, the rate at which a suitable gas turbine can optimally accept nitrogen would be so low that were that nitrogen used to extract heat from the minor air stream, its resulting temperature would be above that recommended for use in a gas turbine.

BRIEF DESCRIPTION OF THE DRAWINGS

A method and plant according to the invention will now be described by way of example with reference to the accompanying drawings, in which.

DETAILED DESCRIPTION

Figure 1:
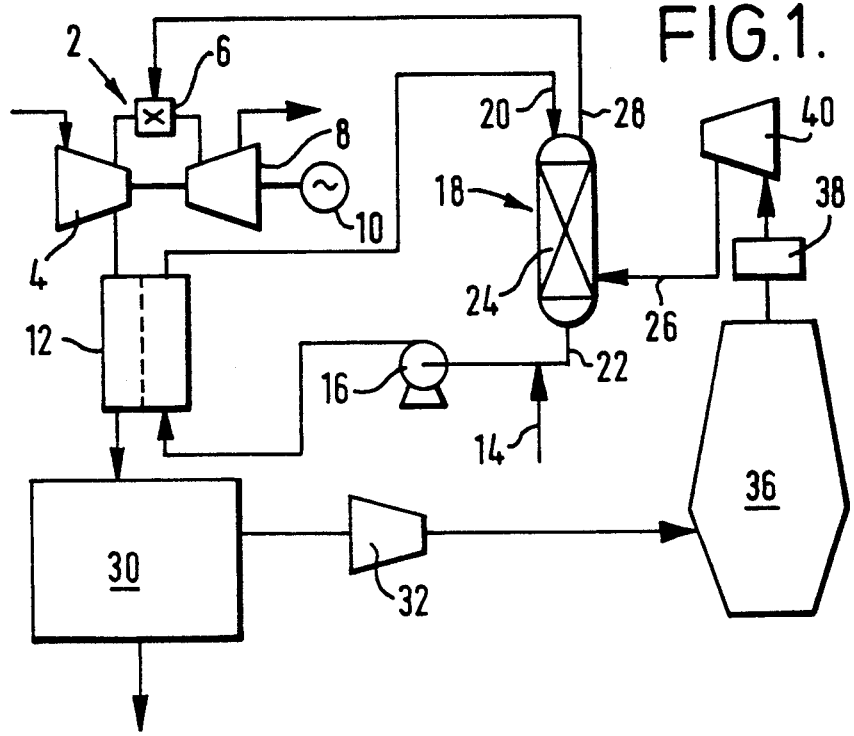
FIG. 1 is a flow diagram illustrating an integrated plant comprising a blast furnace, a gas turbine and an air separation unit.

Referring to FIG. 1 of the drawings, the illustrated plant includes a gas turbine 2 comprising an air compressor 4, a combustion chamber 6 and an expansion turbine 8. The rotor (not shown) of the compressor 4 is mounted on the same shaft as the rotor (not shown) of the turbine 8 and thus the turbine 8 is able to drive the compressor 4. The compressor 4 draws in a flow of air and compresses it to a chosen pressure in the range of 10 to 20 atmospheres absolute. The compressor 4 has no means associated therewith for removing heat of compression. The compressed air thus leaves the compressor 4 at a temperature typically in the order of 400° C. This compressed air stream is divided into a major and a minor stream. Typically, the minor stream comprises from 20 to 35% of the total air flow in the kind of plant illustrated in FIG. 1 of the drawings. The major stream is supplied to the combustion chamber 6 and is employed to support combustion of a fuel gas also supplied to the combustion chamber 6. The resulting hot stream of combustion gases flows into the expansion turbine 8 and is expanded therein to a pressure a little above atmospheric pressure. The expansion turbine 8 as well as driving the compressor 4 also drives an alternator 10 which is used in the production of electrical power.

The minor stream of compressed air flow through a heat exchanger 12 in which it is cooled to ambient temperature or a temperature a little thereabove by countercurrent heat exchange with a circulating stream of pressurized water. The pressurized stream of water flows in a circuit comprising, in sequence, starting from an inlet 14 for introducing make-up water, a pump 16 intermediate the colder end of the heat exchanger 12 and the inlet 14, the heat exchanger 12 itself, and a liquid-gas contact column 18 having an inlet 20 at its top for pressurized, heated water and an outlet 22 at its bottom. The water leaving the bottom of the column 18 through the outlet is united with make-up water introduced through the inlet 14, thus completing the circuit. In operation of the plant shown in FIG. 1, the pump 16 raises the pressure of the water to a value in the range of 20 to 25 bars. The water is then heated to a temperature in the order of 200° C. by countercurrent heat exchange in the heat exchanger 12 with the minor air stream from the compressor 4. The pump 16 provides a flow of pressurized water through the heat exchanger 12 that is adequate to ensure that the pressurized water remains in the liquid phase throughout its passage through the heat exchanger 12 even though the temperature of the air taken from the compressor 4 is typically in the range of 350° to 450° C. If desired, this air stream may be precooled upstream of its passage through the heat exchanger 12.

Downstream of the heat exchanger 12 the pressurized water flows to the inlet 20 of the liquid-gas contact column 18. The column 18 has a packing 24 for effecting contact between a descending flow of pressurized hot water and a rising flow of fuel gas introduced at the bottom of the column 18 beneath the packing 24 through an inlet 26. As the fuel gas descends the column 18 passing through the packing 24 so it is gradually heated by contact with the hot pressurized water flow. In addition, water is transferred from the liquid phase to the gas phase and the fuel gas is as a result moisturized. The fuel leaves the column 18 through an outlet 28 at the top at a temperature in the order of 150° C. and a pressure in the order of 15 to 20 atmospheres absolute and is saturated with water vapor. The fuel gas stream then flows to the combustion chamber 6 of the gas turbine 2. (If desired, the fuel gas stream may be raised in temperature to 200° C. by being heated in a further heat exchanger (not shown) intermediate the column 18 and the combustion chamber 6.) Water flows out of the column 18 through the outlet 22 and is then mixed with make-up water from the inlet 14. There is thus a continuous flow of water around the circuit comprising the pump 16, the heat exchanger 12 and column 18.

Downstream of the heat exchanger 12 the minor air stream flows into a plant 30 for separating air by rectification. The plant may for example be of the kind described with reference to and shown in FIG. 1 of EP-A-0 384 688.

A stream of oxygen product and a stream of nitrogen product are withdrawn from the plant 30. The stream of oxygen product is compressed to a pressure of about eight bar absolute in an oxygen compressor 32. The compressed oxygen stream is used to enrich in oxygen an air blast which is supplied to a blast furnace 36. Alternatively, or in addition, the oxygen can be supplied directly to the tuyeres (not shown) of the blast furnace 36.

The blast furnace 36 is used to reduce iron ore to make iron by reaction with a solid carbonaceous fuel. The necessary heat for the reaction is generated by the reaction of the oxygen enriched air with the carbonaceous fuel. As a result of the reactions that take place in the blast furnace, a gas mixture comprising carbon monoxide, hydrogen, carbon dioxide, nitrogen and argon is produced. It typically has a calorific value in the order of 3 to 5 $MJ/m^3$ depending on the degree of enrichment of the air blast. The gas mixture leaving the top of the blast furnace will also typically contain traces of oxides of sulphur and other undesirable gaseous substances, be laden with particulate contaminants, and be at a temperature above ambient. The gas mixture is treated in a plant 38 of conventional kind to cool it to ambient temperature, and to remove undesirable gaseous impurities of particulate contaminants.

The resulting purified fuel gas stream from the plant 38 is then compressed in a compressor 40 and raised to a pressure such that after passage through the packed column 18 it is able to enter the combustion chamber 6 at the required elevated pressure. The resulting compressed fuel gas is the source of the gas entering the packed column 18 through the inlet 26.

If desired, not all the fuel gas leaving the clean-up plant 38 need flow to the compressor 40. Instead, some can be used for heating purposes on the site of the blast furnace 36. For example, some of the fuel gas can be burned to generate heat for preheating the air blast flowing to the blast furnace 36.

Figure 2:
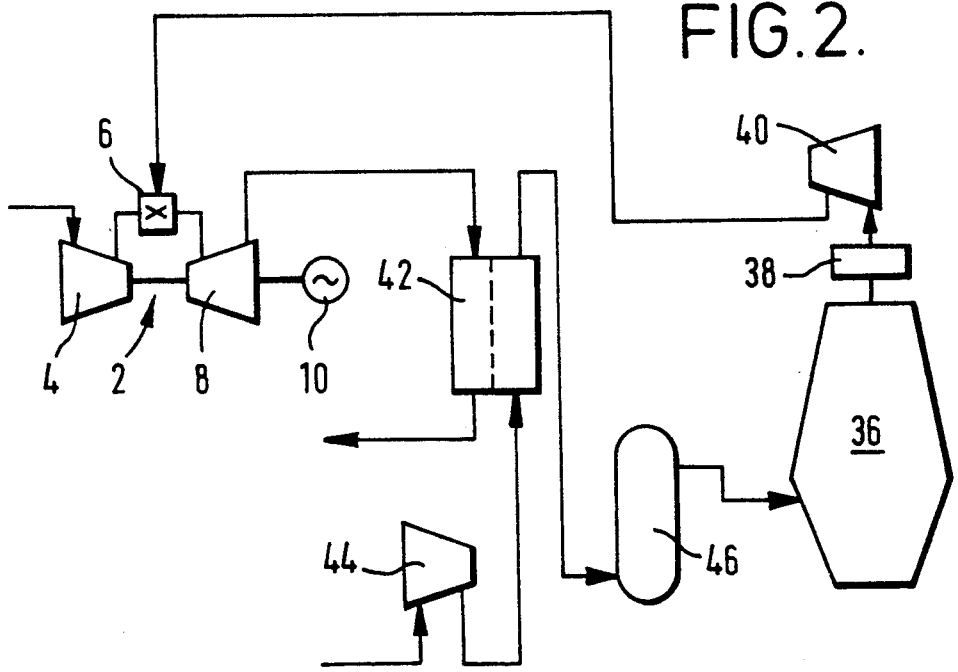
FIG. 2 is a flow diagram illustrating apparatus for utilizing a gas stream exhausted from the gas turbine shown in FIG. 1.

An alternative or additional method for preheating the air supplied to the blast furnace 36 is shown in FIG. 2. Like part shown in FIGS. 1 and 2 are identified by the same reference numerals.

A hot gas stream leaving the expander 8 of the gas turbine 2 at a temperature in the range of 450° to 600° C. and a pressure in the order of 1 atmosphere absolute flows into a heat exchanger 42 in which it is cooled by countercurrent heat exchange with a compressed air stream. The compressed air stream is created by operating an air compressor 44 separate from the air compressor 4 of the gas turbine 2. The air compressor 44 raises the pressure of the air to a level suitable for its introduction into the blast furnace 36. This pressure is typically in the range of 4 to 5 atmospheres absolute. This compressed air stream is heated to a temperature in the order of 500° C. by passage through the heat exchanger 42 as aforesaid. The resulting preheated air stream then flows through a series of stoves 46 in which it is heated to a temperature in the range of 1000° to 1200° C. Preheating of the air is able to make possible considerable savings in the rate at which fuel needs to be burnt in order to provide heating for the stoves. The hot air leaving the stoves is then introduced into the blast furnace 36.

Typically, approximately half the flow of exhaust gas out of the expander 8 is needed to raise the temperature of the blast air to 500° C. The remainder of the exhaust gas may for example be used for steam raising.

The operation of the plant shown in FIGS. 1 and 2 is further illustrated by the following example.

A fuel gas stream flows from the compressor 40 to the column 18 at a rate of 63.3 kg/s, having a temperature of 130° C. and a pressure of 20 bar. It has the following approximate composition by volume:

CO 26.4%; $CO_2$ 24.8%; $N_2$ 43.1%; $H_2$ 5.7% and a calorific value of 4.2 MJ/Nm3.

Water is added to the fuel in the column 18 at a rate of 7.1 kg/s and the resulting moisturized fuel gas leaves the column 18 at a temperature of 150° C. and a pressure of 19 bar. The temperature of the moisturized fuel gas stream is then raised to 200° C. in a heat exchanger (not shown) and flows into the combustion chamber 6 at a pressure of 16 bar and a temperature of 200° C. The gas turbine 2 may be a SIEMENS V64.3 gas turbine. Such moisturization of the fuel gas is able to enhance the power output of the gas turbine 2 from 59 to 62 MW. Typically, in this example, air is bled for separation from the compressor 4 at a rate of 43.1 kg/s, a pressure of 15.6 bar and a temperature of 400° C. Nitrogen product at a pressure of 4.8 bar is produced at a rate of 34.4 kg/s. Oxygen product is produced at a rate of 8.7 kg/s and is fed by the compressor 32 to the blast furnace 36 at a pressure of 8 bar.

I claim:

1. An integrated method of separating air and generating power, comprising:
    a) compressing air without removing at least part of the heat of compression thereby generated;
    b) dividing the compressed air flow into a major stream and a minor stream;
    c) cooling the compressed minor air stream by heat exchange with a pressurized stream of water;
    d) separating the minor air stream into oxygen and nitrogen;
    e) moisturizing a stream of compressed low grade fuel gas by introducing it into said pressurized stream of water downstream of the heat exchange between the stream of water and the minor air stream;
    f) burning said stream of compressed low grade fuel gas utilizing said major air stream to support its combustion; and
    g) expanding with the performance of external work the combustion gases from the burning of the gaseous fuel stream, the work performed comprising the generation of said power.

2. The method as claimed in claim 1 in which the fuel gas is saturated with water vapor.

3. The method as claimed in claim 1, in which the low grade fuel gas stream is moisturized with the stream of pressurized water by countercurrent contact of the two streams with one another in a liquid-gas contact column.

4. The method as claimed in claim 1, in which oxygen generated by the separation of air is used in a process which generates the low grade fuel gas.

5. The method as claimed in claim 1, in which nitrogen generated by the separation of the air is liquefied.

6. The method as claimed in claim 1, in which the fuel gas is generated in the reduction in a blast furnace of iron to iron ore.

7. The method as claimed in claim 6, in which:
    the combustion gases are expanded in a turbine; and
    air supplied to the blast furnace is pre-heated by exhaust gas from the said turbine.

8. The method as claimed in claim 6, in which from 20 to 35% of the compressed air is taken for air separation.

9. The method as claimed in claim 6, in which the stream of compressed low grade fuel gas is burned in a combustion chamber and the stream of compressed low grade fuel gas enters the combustion chamber at a temperature under 300° C.

10. An integrated plant for separating air and generating power, comprising: a gas turbine comprising an air compressor, a combustion chamber and an expander; a heat exchanger having a first inlet communicating with an outlet from the air compressor and a second inlet communicating with a source of pressurized water, whereby in operation an air stream withdrawn from the compressor is able to be heat exchanged with a pressurized stream of water; means for separating the heat exchanged air into oxygen and nitrogen; means for moisturizing a compressed low grade fuel gas with said heat exchanged pressurized stream of water; and power generation means adapted to be driven by the gas turbine, wherein the combustion chamber communicates with an outlet from the air compressor and with said means for moisturizing the low grade compressed fuel gas and is able in operation to employ air from the compressor to support combustion of the fuel gas to provide hot gaseous combustion products for expansion in the expander.

11. The plant as claimed in claim 10, in which the means for separating the heat exchanged air into oxygen and nitrogen is a cryogenic air separation plant.

12. The plant as claimed in claim 10, in which the means for moisturizing the compressed low grade fuel gas is a countercurrent liquid-contact column.

13. The plant as claimed in claim 10, further comprising a blast furnace for making iron from iron ore and for generating the fuel gas.

14. The plant as claimed in claim 13, in which the means for separating the heat exchanged air has an outlet for oxygen communicating with the blast furnace.

15. The plant as claimed in claim 13, in which there is an additional heat exchanger for pre-heating air supplied to the blast furnace by heat exchange with exhaust gas from said expander.

* * * * *